United States Patent
Smith

(10) Patent No.: US 9,714,363 B2
(45) Date of Patent: Jul. 25, 2017

(54) SILICONE POLYUREA

(71) Applicant: SUPER SKIN SYSTEMS, INC., Lawrenceville, GA (US)

(72) Inventor: Stuart Bruce Smith, Lawrenceville, GA (US)

(73) Assignee: SUPER SKIN SYSTEMS, INC., Lawrenceville, GA (US)

( * ) Notice: Subject to any disclaimer, the term of this patent is extended or adjusted under 35 U.S.C. 154(b) by 0 days.

(21) Appl. No.: 14/973,112

(22) Filed: Dec. 17, 2015

(65) Prior Publication Data

US 2016/0177132 A1   Jun. 23, 2016

Related U.S. Application Data

(60) Provisional application No. 62/096,390, filed on Dec. 23, 2014.

(51) Int. Cl.

| | | |
|---|---|---|
| *C09D 183/08* | (2006.01) | |
| *C09D 175/02* | (2006.01) | |
| *C08G 18/50* | (2006.01) | |
| *C08G 18/61* | (2006.01) | |
| *C08G 18/65* | (2006.01) | |
| *C08G 18/76* | (2006.01) | |
| *C08G 18/12* | (2006.01) | |
| *C09D 175/08* | (2006.01) | |
| *C08G 18/32* | (2006.01) | |
| *C08G 18/48* | (2006.01) | |
| *C08G 77/458* | (2006.01) | |

(52) U.S. Cl.
CPC ........... *C09D 183/08* (2013.01); *C08G 18/12* (2013.01); *C08G 18/324* (2013.01); *C08G 18/4812* (2013.01); *C08G 18/5024* (2013.01); *C08G 18/61* (2013.01); *C08G 18/6505* (2013.01); *C08G 18/7671* (2013.01); *C08G 77/458* (2013.01); *C09D 175/02* (2013.01); *C09D 175/08* (2013.01)

(58) Field of Classification Search
CPC ............................... C09D 175/02; C09D 83/08
See application file for complete search history.

(56) References Cited

U.S. PATENT DOCUMENTS

| | | |
|---|---|---|
| 8,846,827 B2 | 9/2014 | Mowrer |
| 2004/0054112 A1* | 3/2004 | Smith .................... C08G 18/10 528/10 |
| 2007/0100112 A1 | 5/2007 | Sarpeshkar et al. |
| 2013/0203934 A1 | 8/2013 | Best et al. |
| 2014/0272424 A1 | 9/2014 | Olson |

OTHER PUBLICATIONS

Buestrich, European Publication and Search Report; EP 15201940; Munich, May 20, 2016, 11 pages.
Buestrich, European Search Report Written Opinion; EP 15201940; Munich, May 20, 2016, 3 pages.

* cited by examiner

*Primary Examiner* — Kuo-Liang Peng
(74) *Attorney, Agent, or Firm* — Stetina Brunda Garred & Brucker

(57) ABSTRACT

Novel polyurea siloxane coating compositions are contemplated, the compositions being the reaction products of isocyanate prepolymers and resin blends, with the resin blends containing siloxane copolymers in addition to conventional polyurea monomer and polymer resin reactants. Specifically, it has been found that reaction products having superior gloss retention, water resistance, temperature resistance, and chemical resistance may be formed from isocyanate prepolymers and resin blends having various amounts of poly[(3-aminopropyl)methylsiloxane-co-diphenylsiloxane] in addition to aromatic and/or aliphatic polyamines.

11 Claims, No Drawings

SILICONE POLYUREA

CROSS-REFERENCE TO RELATED APPLICATIONS

This patent application claims priority to U.S. Provisional Patent Application Ser. No. 62/096,390, entitled SILICONE POLYUREA, filed Dec. 23, 2014, all of the teachings of which are incorporated herein by reference.

STATEMENT RE: FEDERALLY SPONSORED RESEARCH/DEVELOPMENT

Not Applicable

BACKGROUND

1. Technical Field

The present disclosure relates generally to the field of polyurea coatings and composites, and methods of making the same. More particularly, the present disclosure relates to the incorporation of siloxane polymers into two part polyurea elastomer coatings and composites.

2. Related Art

Polyurea are amine-containing terminated polyols reacted with isocyanates. Polyureas were developed in the 1980s for rapid process application of durable protective membranes for a myriad of products and technologies. Conventional polyurea coatings typically possess several characteristics that have made them desirable as a seamless membrane including fast, consistent reactivity and cure, moisture and temperature insensitivity during application, exceptional elastomeric quality, hydrolytically stability (i.e. low water absorption), high thermal stability, an auto catalytic nature, and non-emission of solvents or volatile organic compounds when applied. However, many characteristics of conventional polyureas are unfavorable and limit their use in many applications.

Conventional aromatic polyurea use mixtures of aromatic diamines such as diethyl toluene diamine and polyether amines reacted with a methylene diphenyl isocyanate (MDI) prepolymer. This material reacts rapidly to produce a polyurea, often in ten seconds or less. A conventional aliphatic polyurea can be made with aliphatic isocyanate reacted with aliphatic amines, such as commercially available products like Jefferamine T-403, D400, D2000, or NH 1220 from Huntsman and NH 1420 from Bayer. This reaction can be very fast with gel times of as little as 5 seconds. However, conventional aromatic and aliphatic polyureas are attacked by strong solvents such as xylene, toluene, acetone, low pH acids, and high pH caustics.

Another undesirable characteristic of conventional polyureas is that conventional polyureas possess poor adhesion properties. Specifically, the fast reaction times inherent in conventional polyureas cut short the time needed for a conventional polyurea to penetrate and adhere to its substrate. Commercial epoxy type resins have been used in place of conventional polyureas because they are slow to react but penetrate to give excellent adhesion and chemical resistance.

A further problem with conventional polyureas and epoxies is that they do not possess good color stability or UV resistance. Aromatic polyureas, due to their aromatic reactants, generally turn yellow or brown when exposed to ultraviolet (UV) light and oxygen. Since polyureas can be formulated in a variety of colors, this discoloration may adversely affects the intended finish color of the conventional polyurea coating, especially for outdoor application and with lighter colors.

Additionally, conventional polyurea coating tend to absorb liquids such as water, ethanol, or toluene, and over time, may distort and lose their tear strength. Furthermore, at lower temperatures, conventional polyureas can lose their flexibility and become brittle and subject to cracking.

Therefore, there is a need for a polyurea with a silicone backbone that would increase chemical resistance, UV stability, and temperature resistance.

BRIEF SUMMARY

To solve these and other problems, it is contemplated that novel polyurea siloxane coating compositions are may be utilized, the compositions being the reaction products of isocyanate prepolymers and resin blends, with the resin blends containing siloxane copolymers in addition to conventional polyurea monomer and polymer resin reactants. Specifically, it has been found that reaction products having superior gloss retention, water resistance, temperature resistance, and chemical resistance may be formed from isocyanate prepolymers and resin blends having of various amounts of poly[(3-aminopropyl)methylsiloxane-co-diphenylsiloxane] in addition to aromatic and/or aliphatic polyamines.

The polyurea siloxane coating composition may be, for example, the reaction product of an isocyanate prepolymer and a resin blend, the resin blend comprising poly[(3-aminopropyl)methylsiloxane-co-diphenylsiloxane], one or more aromatic diamines, one or more bifunctional polyetheramines, and one or more trifunctional polyetheramines. In on specific embodiment, the resin blend may comprise about 4 parts by weight (pbw) poly[(3-aminopropyl)methylsiloxane-co-diphenylsiloxane], about 25 pbw aromatic diamines, about 46 pbw bifunctional polyetheramines, and about 10 pbw trifunctional polyetheramines.

The aromatic diamines may be, in some embodiments, diethyl toluene diamine (DMDTA). However, in other embodiments, it may be seen that aromatic diamines may be utilized, including but not limited to dimethyl thio-toluene diamine (DMTDA).

The isocyanate prepolymer may be, in some embodiments, one or more isomers of methylene diphenyl diisocyanate (MDI). However, in other embodiments, it may be seen that other isocyanate prepolymers may be utilized, including but not limited to hexamethylene diisocyanate (HDI) Trimer, HDI Biuret, or HDI allophanate. The isocyanate content of the isocyanate prepolymer may also vary. Exemplary formulations of isocyanate prepolymers having isocyanate contents of between 10% and 25% are disclosed herein. However, it may be various other isocyanate contents may be utilized and may still be within the scope and spirit of the inventions disclosed herein.

In certain disclosed exemplary embodiments, it is contemplated that the reaction products herein disclosed are formed via reacting the isocyanate prepolymers with the resin blends at about a 1:1 parts by volume (pbp) ratio, which may aid in using these novel coating compositions in conventional two-component spraying systems. However, it may be seen that the reaction products herein disclosed may be formed from combinations of the isocyanate prepolymer and resin blends at other ratios, without departing from the scope and spirit of the inventions disclosed herein.

The bifunctional polyetheramines utilized in the various exemplary resin blends may be, in certain exemplary embodiments, a primary diamine such as poly(oxypropylene)diamine, which has the general formula:

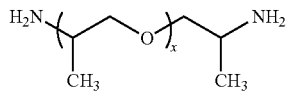

However, it other embodiments, other bifunctional polyetheramines may be utilized, including for example but without limitation, secondary diamines. It may be additionally appreciated that various polymer lengths may also be utilized, and for certain application, it may be preferred to use polymer compositions having higher or lower average chain lengths and molecular weights.

The trifunctional polyetheramines utilized in the various exemplary resin blends may be, in certain embodiments, primary triamines such as trimethylpropane poly(oxypropylene)triamine may be utilized, which has the general formula:

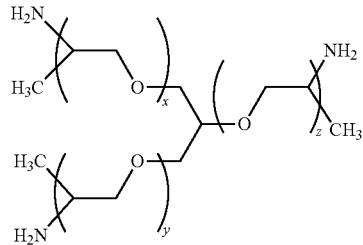

However in other embodiments, other trifunctional polyetheramines may be utilized, such as secondary triamines. It may be additionally appreciated that various polymer lengths may also be utilized, and for certain application, it may be preferred to use polymer compositions having higher or lower average chain lengths and molecular weights.

In other specifically contemplated embodiments, polyaspartic siloxane coating compositions are contemplated, which comprise the reaction product of an isocyanate prepolymer and a resin blend, with the resin blend comprising poly[(3-aminopropyl)methylsiloxane-co-diphenylsiloxane] and one or more polyaspartic esters. In one specific embodiment of this type, the resin blend may comprise 5 pbw poly[(3-aminopropyl)methylsiloxane-co-diphenylsiloxane] and 95 pbw polyaspartic esters, with the isocyanate prepolymer comprising an aliphatic isocyanate having about a 23% isocyanate content. The polyaspartic ester is contemplated to be in that one specific embodiment, tetraethyl N,N'-(methylenebis(2-methyl-4,1-cyclohexanediyl)), which has the formula:

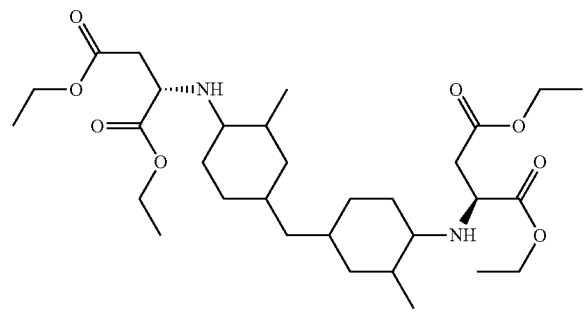 [SMILES: CCOC(=O)C[C@H](NC1CCC(CC2CCC(N[C@@H](CC(=O)OCC)C(=O)OCC)C(C)C2)CC1C)C(=O)OCC]

However, it may be seen that in other embodiments, other polyaspartic esters may be utilized in different concentration without departing from the scope and spirit of the inventions disclosed herein.

In further embodiments, a polyurea siloxane coating is contemplated composition comprising the reaction product of an isocyanate prepolymer and a resin blend is contemplated, with the resin blend comprising poly[(3-aminopropyl)methylsiloxane-co-diphenylsiloxane] and one or more aromatic diamines. One specifically disclosed embodiment contemplates the resin blend comprising about 60 pbw poly[(3-aminopropyl)methylsiloxane-co-diphenylsiloxane] and about 25 pbw aromatic diamines, with the isocyanate prepolymer comprising an aliphatic isocyonate having about a 23% isocyanate content.

DETAILED DESCRIPTION

According to various aspects of the present disclosure, new types of silicone polyureas are contemplated, wherein the resin blend that is combined with the isocyanate prepolymer incorporates poly[(3-aminopropyl)methylsiloxane-co-diphenylsiloxane]. In a first exemplary embodiment, a polyurea siloxane coating composition is contemplated as the reaction product of 1:1 parts by volume (pbv) mixture of a methylene diphenyl diisocyanate prepolymer having a 16% isocyanate content and a resin blend comprising about 25 parts by weight (pbw) diethyl toluene diamine (DEDTA), about 46 pbw poly(oxypropylene)diamine (MW≈2000), about 10 pbw trimethylpropane poly(oxypropylene)triamine (MW≈5000), and about 4 pbw poly[(3-aminopropyl)methylsiloxane-co-diphenylsiloxane]. In a second exemplary embodiment, a polyaspartic siloxane coating composition is contemplated as the reaction product of a 1:1 pbv mixture of aliphatic triisocyanate prepolymer having a 23% isocyanate content and a resin blend having about 5 pbw poly[(3-aminopropyl)methylsiloxane-co-diphenylsiloxane] and about 95 pbw, tetraethyl N,N'-(methylenebis(2-methyl-4,1-cyclohexanediyl))bisaspartate. A third exemplary embodiment is additionally contemplated to be a polyurea siloxane coating composition formed as the reaction product of a 1:1 mixture of aliphatic triisocyanate prepolymer having about a 23% isocyanate content and a resin blend having about 60 pbw poly[(3-aminopropyl)methylsiloxane-co-diphenylsiloxane] and about 25 pbw DEDTA. These exemplary embodiments display superior attributes to conventional polyureas.

Poly[(3-aminopropyl)methylsiloxane-co-diphenylsiloxane] is a siloxane copolymer having the general formula:

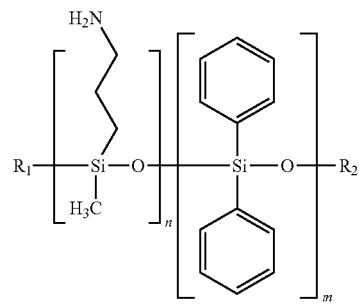

It may be seen that in certain embodiments, the poly[(3-aminopropyl)methylsiloxane-co-diphenylsiloxane] used may be many types of copolymer having varied distributions and arrangements of the (3-aminopropyl)methylsiloxane) and the diphenylsiloxane units, and that the arrangement, distribution, and number of these units may affect the final material properties of a cured polyurea reaction product incorporating poly[(3-aminopropyl)methylsiloxane-co-diphenylsiloxane] may change depending on the specific arrangement and distribution of those units. For example, a random copolymer may be utilized wherein the chance of finding a particular monomer at any given location in the polymer is directly proportional to the molar fraction of that monomer. It may also be seen that other arrangements, such as regularly alternating copolymers or periodic copolymers may be used, where the monomeric units are arranged in a repeating sequence. Likewise, it may also be seen that block copolymers or statistical copolymers may be utilized. Additionally, linear or branched copolymers may be preferred, depending on the needs of the application.

Poly[(3-aminopropyl)methylsiloxane-co-diphenylsiloxane] may be synthesized via known methods of siloxane polymerization, or may be obtained commercially.

Isocyanate prepolymers may be formed from an isocyanate curing agent and polyols, such that a given percentage by weight (the isocyanate content) of the isocyanate functional groups remain unreacted and ready for further reaction with primary and secondary amines. For example, in the first exemplary embodiment, a methylene diphenyl diisocyanate prepolymer is utilized having a 16% isocyanate content. However, it may be seen that in other embodiments, other isocyanate curing agents may be used to form the isocyanate prepolymer, or combinations of isocyanate curing agents, including but not limited to hexamethylene diisocyanate (HDI) Trimer, HDI Biuret, and HDI allophanate. The MDI used to form the isocyanate prepolymer in the first exemplary embodiment is Pure MDI, the 4,4' isomer of MDI. However, in other embodiments utilizing MDI, other MDI isomers or combinations of MDI isomers may be utilized to form the isocyanate prepolyer, such as the 2,2' or 2,4' isomer. Pure MDI or other MDI isomers, or combinations of MDI isomers may be made by known methods of synthesis, or obtained commercially from manufacturers such as Dow Corporation, which sells Pure MDI under the trade name ISONATE 125M, or Huntsman Corporation, which sells a mixture of about 70% 4,4' MDI and 30% 2,4' MDI under the trade name SUPRASEC 9150. It may additionally be seen that isocyanate prepolymers having different isocyanate contents may be utilized, as well as different ratios of isocyanate prepolymer to resin blends than in the three exemplary embodiments, which use a 1:1 ratio of parts by volume (pbv).

The reaction of the isocyanate prepolymer with the poly[(3-aminopropyl)methylsiloxane-co-diphenylsiloxane]-containing resin blend may occur according to typical ways known in the field of polymer coating compositions, including but not limited to two component spraying systems, extrusion coating dies, or casting.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A polyurea siloxane coating composition comprising the reaction product of an isocyanate prepolymer and a resin blend, the resin blend comprising:
   poly[(3-aminopropyl)methylsiloxane-co-diphenylsiloxane];
   one or more aromatic diamines;
   one or more bifunctional polyetheramines; and
   one or more trifunctional polyetheramines.

2. The polyurea siloxane coating composition of claim 1, wherein the resin blend comprises:
   about 4 pbw poly[(3-aminopropyl)methylsiloxane-co-diphenylsiloxane];
   about 25 pbw aromatic diamines;
   about 46 pbw bifunctional polyetheramines; and
   about 10 pbw trifunctional polyetheramines.

3. The polyurea siloxane coating of claim 1, wherein the one or more aromatic diamines comprises diethyl toluene diamine.

4. The polyurea siloxane coating composition of claim 1, wherein the isocyanate prepolymer comprises one or more isomers of methylene diphenyl diisocyanate and has isocyanate content of 16% or less.

5. The polyurea siloxane coating composition of claim 1, wherein the isocyanate prepolymer and the resin blend are reacted at about a 1:1 pbv ratio.

6. The polyurea siloxane coating composition of claim 1, wherein the bifunctional polyetheramines comprise a bifunctional polyetheramine having the general formula:

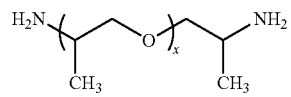

where x has a mean value of about 33.

7. The polyurea siloxane coating composition of claim 1, wherein the trifunctional polyetheramines comprise a trifunctional polyetheramine having the general formula:

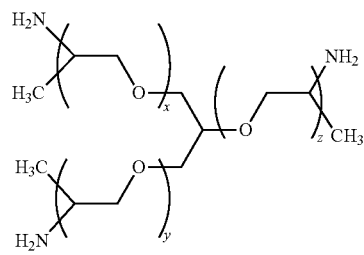

where (x+y+z) is about 85.

8. A polyurea siloxane coating composition comprising the reaction product of an isocyanate prepolymer and a resin blend, the resin blend comprising:
   poly[(3-aminopropyl)methylsiloxane-co-diphenylsiloxane]; and
   one or more aromatic diamines.

9. The polyurea siloxane coating composition of claim 8, wherein the resin blend comprises:
   about 60 pbw poly[(3-aminopropyl)methylsiloxane-co-diphenylsiloxane]; and
   about 25 pbw aromatic diamines.

10. The polyurea siloxane coating composition of claim 8, wherein the one or more aromatic diamine comprise diethyl toluene diamine.

11. The polyurea siloxane coating composition of claim 8, wherein the isocyanate prepolymer and the resin blend are reacted at about a 1:1 pbv ratio.

* * * * *